United States Patent [19]

Sinanan

[11] Patent Number: 5,852,895
[45] Date of Patent: Dec. 29, 1998

[54] RAISED PLANTER

[76] Inventor: Terry Sinanan, 54-23 Kimberley Dr., Hamilton, Ontario, Canada, L8K 6N8

[21] Appl. No.: 848,497

[22] Filed: May 8, 1997

[51] Int. Cl.[6] .................................................. A01G 9/02
[52] U.S. Cl. .................................. 47/33; 47/39; 47/48.5
[58] Field of Search .................. 47/33, 39, 48.5, 47/66.1; 52/102; 404/7, 8

[56] References Cited

U.S. PATENT DOCUMENTS

| | | | |
|---|---|---|---|
| 2,115,868 | 5/1938 | McIntosh | 47/33 X |
| 3,387,786 | 6/1968 | Rynberk | 47/33 X |
| 3,865,309 | 2/1975 | Greenhalgh | 47/33 X |
| 4,120,119 | 10/1978 | Engel | 47/66.1 |
| 4,420,902 | 12/1983 | Rayner | 47/39 X |
| 4,825,588 | 5/1989 | Norman | 47/66.1 |
| 5,664,367 | 9/1997 | Huang | 47/39 X |

FOREIGN PATENT DOCUMENTS

| | | | |
|---|---|---|---|
| 601788 | 7/1960 | Canada | 47/48.5 |

*Primary Examiner*—Michael J. Carone
*Assistant Examiner*—Elizabeth Shaw

[57] ABSTRACT

A planter assembly comprises a planter box and a support structure for the planter box. The support structure is formed by an elevating post, a base beneath the post and a planter box support atop the post. The post is releasably secured within the support structure which enables height adjustment trimming and then refitting of the post with the support structure.

6 Claims, 5 Drawing Sheets

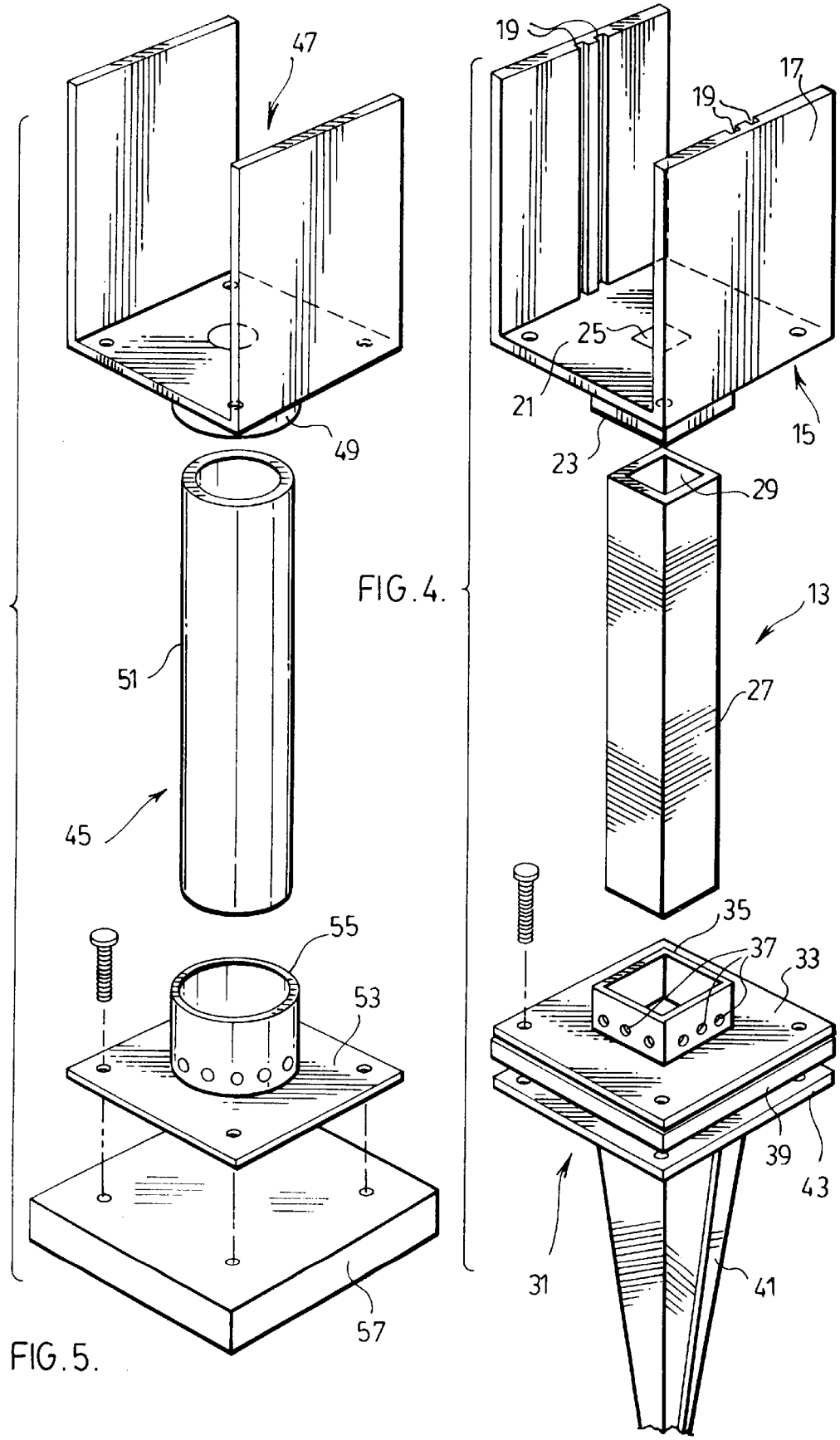

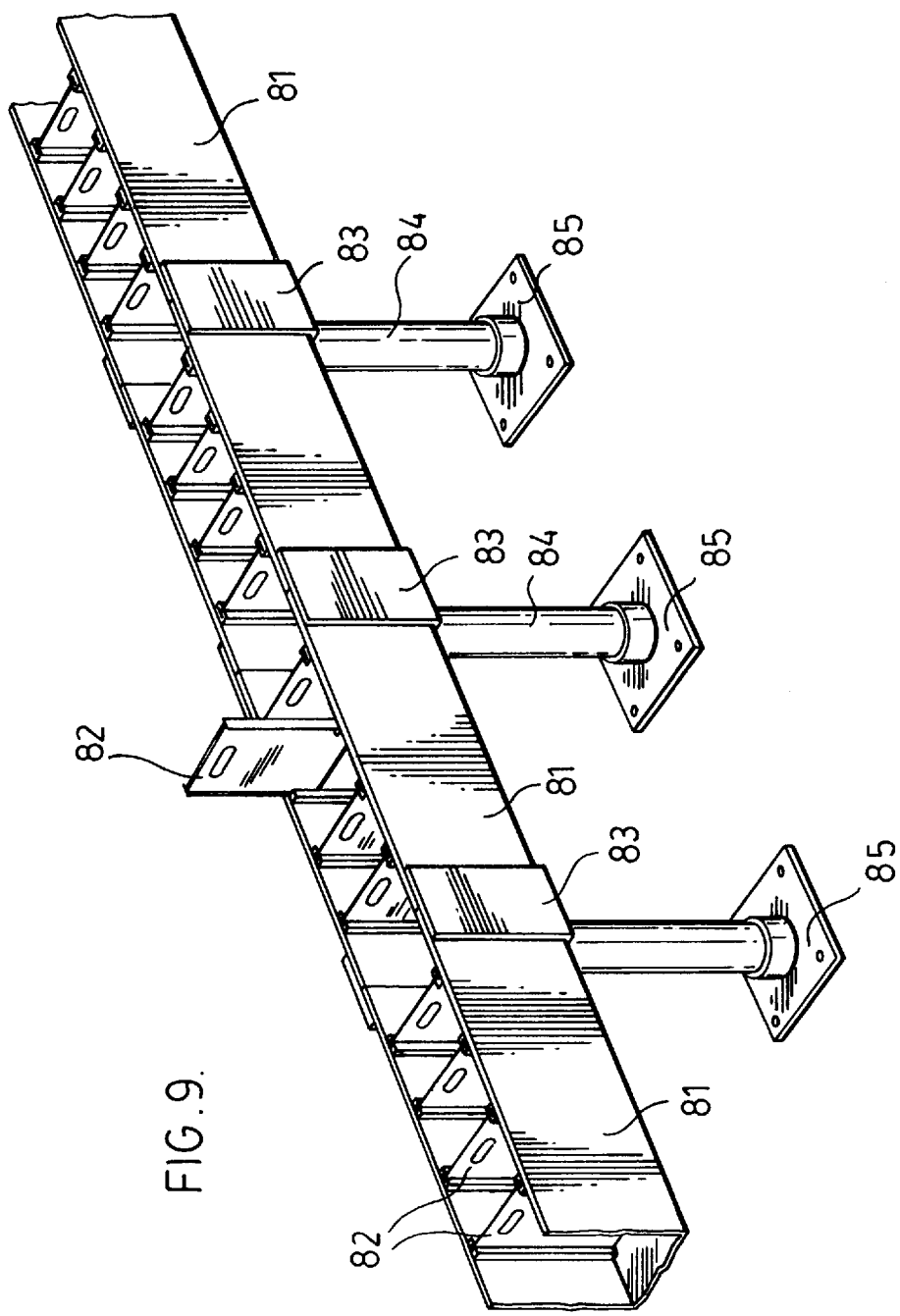

RAISED PLANTER

FIELD OF THE INVENTION

The present invention relates to an elevated multi-component planter assembly.

BACKGROUND OF THE INVENTION

A typical planter is in the form of a flower pot or an elongated box generally placed at ground level. In this position, users must kneel or bend over to get close to the plants and soil for watering, feeding, turfing soil, molding, transplanting and cleaning, which does not allow the user to work with the plants in a standing upright position.

It is also known to elevate planter boxes through which the use of hanger brackets. However, this requires a pre-installed railing or the like in order to receive the hanger bracket.

U.S. Pat. No. 5,511,342 describes a modular flower pot system. In this system, flower pots are stacked on top of one another to elevate the uppermost flower pot. The flower pots beneath the uppermost flower pot are of a fixed non-variable height which does not allow leveling of adjacent flower pots on a non-level supporting surface for the system.

SUMMARY OF THE INVENTION

According to the present invention, a planter assembly comprises a planter box and a support structure for the planter box. The support structure includes an elevating post, a base beneath the post and a planter box supported atop the post. Either the base or the support or possibly both, are releasable from the post. This enables the post to be trimmed to a desired height and then the base or the support, which ever one has been removed from the post, is refittable with the post after any such trimming or adjustments.

The planter assembly of the present invention lends itself particularly well to the building of a line of end to end planter boxes which can be leveled with one another even when working with an un-level supporting surface for the aligned planter boxes.

BRIEF DESCRIPTION OF THE DRAWINGS

The above as well as other advantages and features of the present invention will be described in greater detail according to the preferred embodiments of the present invention in which:

FIG. 4 is an exploded perspective view of one of the support structures from the planter system of FIGS. 1 and 2;

FIG. 5 is an exploded perspective view of a support structure according to a different preferred embodiment of the present invention;

FIG. 9 is a sectional perspective view of a planter system according to a further preferred embodiment of the invention.

DETAILED DESCRIPTION ACCORDING TO THE PREFERRED EMBODIMENTS OF THE PRESENT INVENTION

Figure 1:
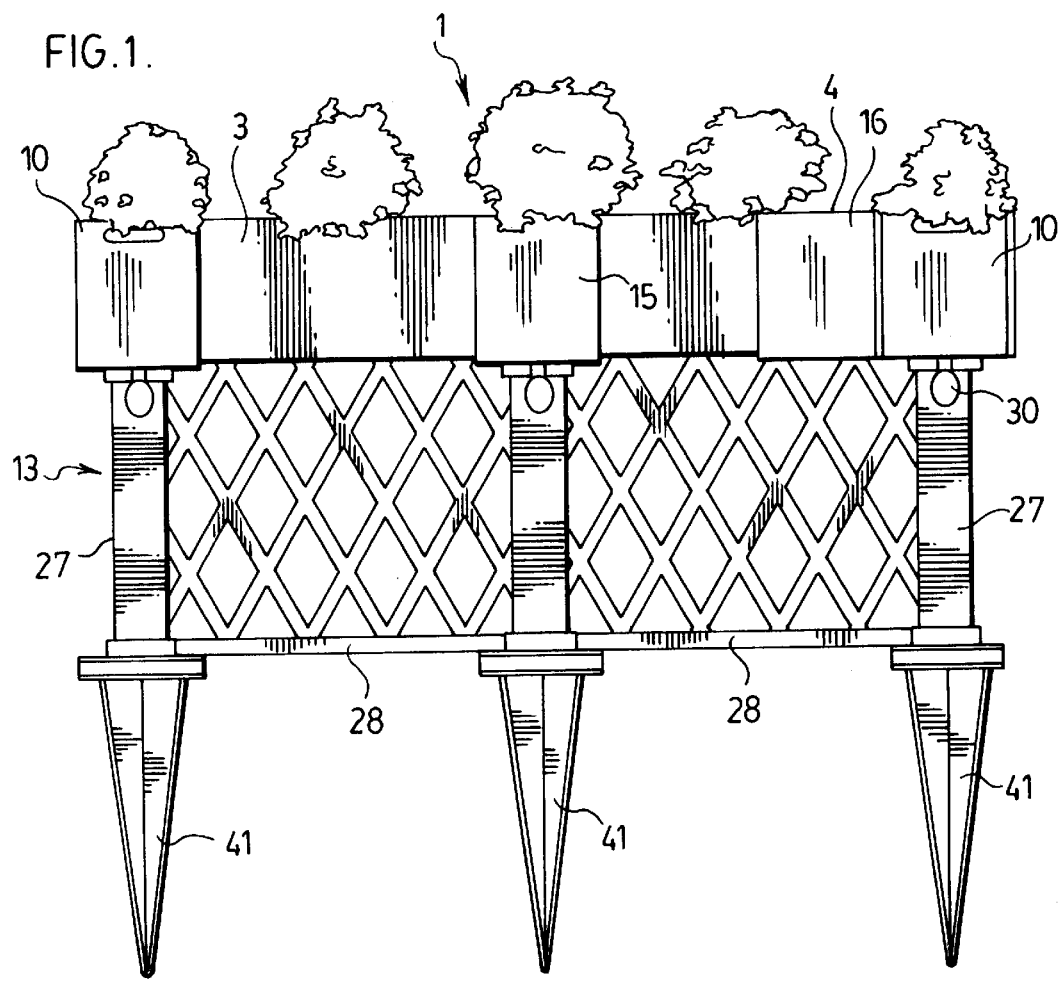
FIG. 1 is a front view of a plurality of planter assemblies put together with one another in forming a combination planter and fencing system according to a preferred embodiment of the present invention.

FIG. 1 shows a planter system generally indicated at 3. This system comprises a series of end to end planter boxes 3 and 4 held in an elevated position by a plurality of support structures 13 to provide a fence with plants along the top of the fence. The fence is completed with lights 30 and decorative panels 28 between the support structures beneath the planter boxes.

Figure 3:
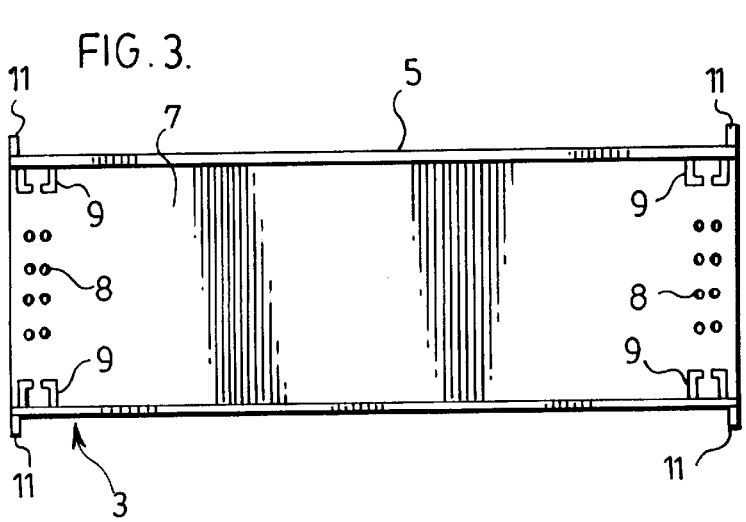
FIG. 3 is a top view of one of the individual planter boxes from the planter system of FIGS. 1 and 2.
Figure 3A:
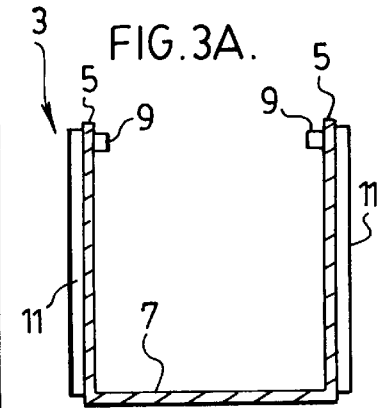
FIG. 3A is an end view of the planter box of FIG. 3.
Figure 2:
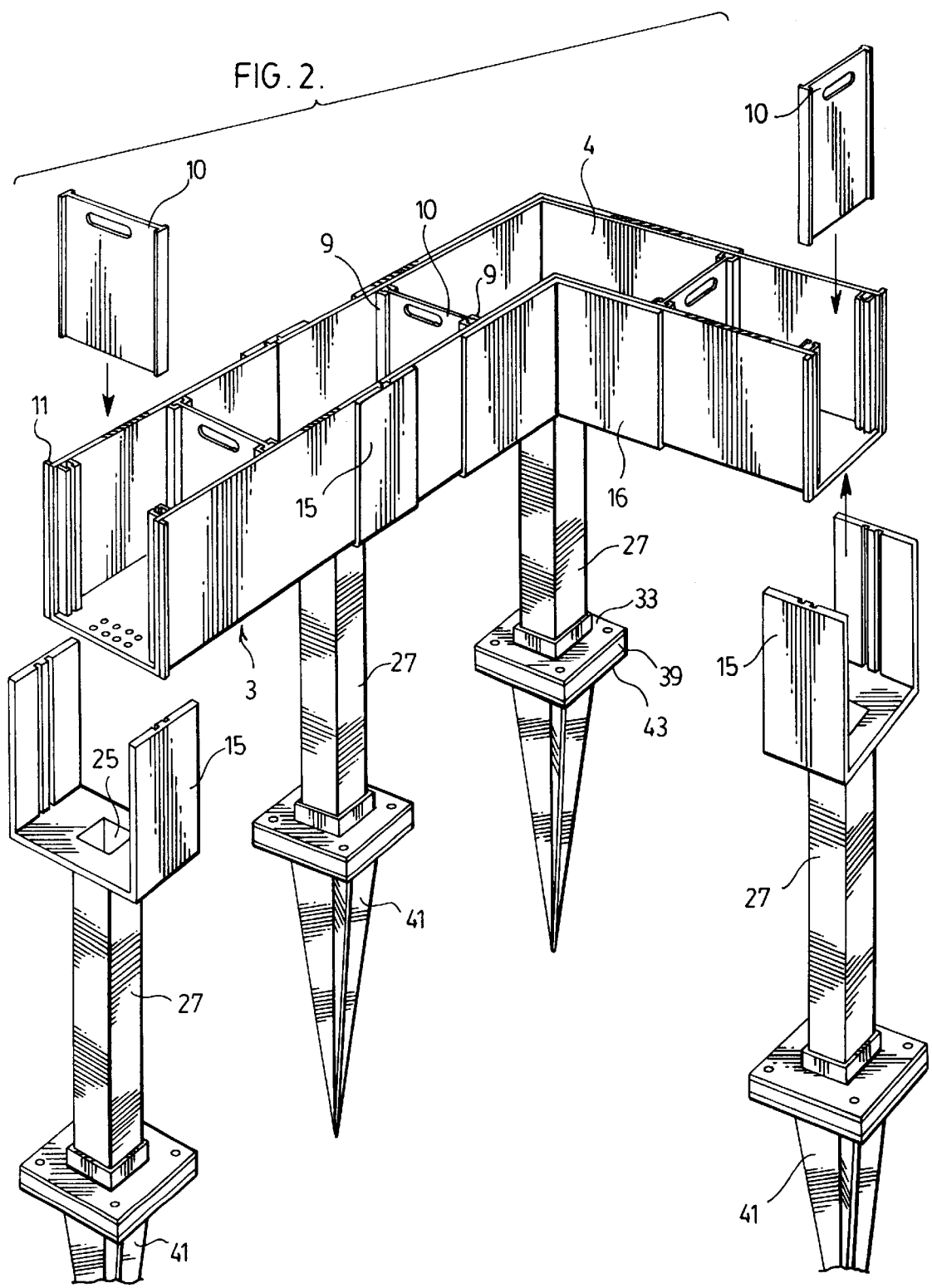
FIG. 2 is a partially exploded perspective view of the planter system of FIG. 1.

The fence of planter boxes as described above can be made to essentially any length and is designed with a corner configuration if desired as well shown in FIG. 2 of the drawings. More particularly, each planter box 3 has a U-shaped open top and open ended construction as seen in FIGS. 3 and 3a of the drawings. This construction comprises side walls 5 and a base wall 7 between the side walls. In the preferred embodiment as shown, the base wall may be provided with drainage openings 8 at either end of the planter box and may also be provided with internal receptacles 9 which are used to releasably secure slide in plates or dividers 10 for reasons to be described later in detail.

In the preferred embodiment, planter box 3 is additionally provided with small tabs 11 on the outside and to each end of the planter box.

The particular support structure 13 used in the FIG. 1 planter system is better shown in FIG. 4 of the drawings. This support structure comprises a post 27 with a planter box support 15 atop the post and a base 23 beneath the post. Again, according to the preferred embodiment, the support structure and the planter box are both made from a plastic material, e.g. PVC or the like.

The planter box support 15 like the planter box, has a U-shaped open ended configuration. The support is much shorter in length than the planter box and has a width such that the planter box fits snugly into the bracket-like support.

The support includes vertical side walls 17 and a base wall 21. In the preferred embodiment as shown, the vertical side walls are provided with a pair of side by side small grooves 19 to the inside of each side wall. The base is provided with a downwardly extending sleeve portion 23 and is open at 25 through the base to the sleeve portion.

Post 27 has a hollow profile with a central hollow region 29 and is of a uniform dimension for some distance at, at least, one end of the post and is preferably uniform over its entire length. This results in a key feature of the present invention to be described later in detail.

Base 31 is formed by a flat plate 33 having an upwardly extending sleeve 35. In the embodiment shown, the plate 33 which, like the rest of the assembly, preferably has a plastic construction sits atop a more rigid reinforcing platform 39. This platform may be made from a material such as a thick piece of wood or even a heavier material such as a slab of concrete or the like. Platform 39 is seated atop a ground spike 41 having an upper end plate 43 directly beneath platform 39. The stake will preferably have a metal construction.

The base assembly including plates 33 and 43 with platform 39 sandwiched between the two plates can be secured by mechanical fasteners as shown in FIG. 4.

As will be understood from the description above, the sleeve 23 of support 15 slides over the upper end of post 27 while the bottom end of the post slides into the sleeve 35 of plate 33. Alternatively, the upper and lower ends of post 27 may slide over support support 15 and sleeve 35. As a result, the post is detachably secured at both of its ends within the support structure such that if the post needs height adjustment, it can be trimmed at either end. Furthermore, because the post is of a uniform dimension for a good distance at each end of the post and in the case shown, uniform over its length, either one of the sleeves 23 and 35 can be refitted with the post after the post has been trimmed.

The above feature is important to the present invention when, for example, the planter assembly is used in combination with other planter assemblies to form a line of planters as shown in FIG. 1 on a non-level ground surface. Any leveling that is required from one planter box to the next can easily be made by trimming the appropriate post.

FIG. 5 of the drawings shows a modified planter box support structure 35. This support structure comprises a main post 51 which slides at its upper end into a sleeve 49 of a planter box support 47. The lower end of the post is slideably secured within a sleeve 55 of a base plate 53. The base plate in this support structure is secured by mechanical fasteners atop a very substantial platform 57. This platform does not include a ground spike but rather is designed to seat on a pre-formed supporting surface such as a wooden deck or a concrete patio. Platform 57 has sufficient weight and balance to hold the support structure from tipping.

It will be noted in comparing FIGS. 4 and 5 that although the two posts and the receiving sleeves for the posts have different cross sectional shapes, they are consistent in the fact that they are both cuttable and refittable within their respective support structures.

The support bracket 47 shown in FIG. 5, unlike the support bracket 15 of FIG. 4, does not include any small interior grooves again for reasons to be described later in detail.

In the description above, reference has been made to the height adjustability of the support structure for forming a line of planter boxes. In some cases, the planter boxes may be set up individually and closed at their opposite ends to provide separated planter boxes. However, even if the planter boxes are separated from one another and if the supporting surfaces for the separated planter boxes are at different heights, the planter boxes themselves can easily be set up such that they are level with one another by an appropriate height adjustment to any one of the supporting posts for the separated planter boxes.

When working with a one to one situation, where there is a support structure for each planter box, supporting brackets would be positioned at the ends of the planter box. The planter box would be firmly held in the brackets as a result of the snug fit between the planter box and the brackets. In this type of set up, there is no need for the internal grooves within the support brackets.

FIG. 2 shows a line of planter boxes with associated support structures and having a corner configuration in that line of planter boxes. This corner configuration includes a corner planter box 4 having an open ended L-shape. This corner box is held by an L-shaped support bracket 16 which fits to support post 27 in a manner identical to any one of the support brackets 15.

In an end to end line of planter boxes as shown in FIG. 2, each planter box rather than being supported centrally, is held at each end by a support bracket. In the preferred embodiment as shown, the opposite ends of each planter box are as earlier described provided with external lips 11 which are slideably fitted into the grooves 19 within the support brackets 15. This prevents the end to end planter boxes from sliding out of the brackets and separating from one another.

It is also possible to use a non-grooved support bracket such as support bracket 47 and to secure the ends of adjacent planter boxes directly to one another through a suitable adhesive or the like.

As also earlier described, each of the planter boxes is provided with internal receptacle 9 which receive slide in plates 10. These plates can be used as either internal dividers or as end stops for the planter boxes. Accordingly, the line of planter boxes can be extended to any desired length and then easily terminated with an end plate. The support bracket at the end of a line of planter boxes can be positioned such that the lips 12 on the planter box fit into the internal grooves of the support bracket or according to the set up as shown in FIG. 2, the support bracket can be positioned such that it is essentially flush with the end of the planter box. In this case, the lips 11 on the planter box sit directly against and are trapped along the outer edge of the support bracket preventing the planter box from sliding off of the support bracket. Also, the end plate may be removed for the line of planter boxes to be extended and the new open end may be capped with the end plate.

When the plates 10 are used as internal dividers, they have a two-fold purpose. Firstly, they reinforce against outward bowing of the side walls of the planter box under the weight of soil and plants placed in the planter box. In addition, the dividers provide different compartments within each planter box. These compartments do not necessarily have to be used for planting but rather can be used for storage or receiving decorative articles other than plants and situated between different planting regions. When adjacent compartments are used as separate planting regions, the plants in one region can be worked with and even removed without disturbing the plants and the root growth in the adjacent compartment because of the dividers.

Another feature of the preferred embodiment of the present invention is that water drainage is provided from the planters through the support structure. As earlier noted, the base wall 7 of the planter box is provided with drainage openings 8 which locate above the opening through the base wall of the support bracket. The water is then able to drain down through the hollow post to the drainage openings at the base of the support structure. This provides drainage without the water having to drip in an uncontrolled manner from the planter.

Figure 6:
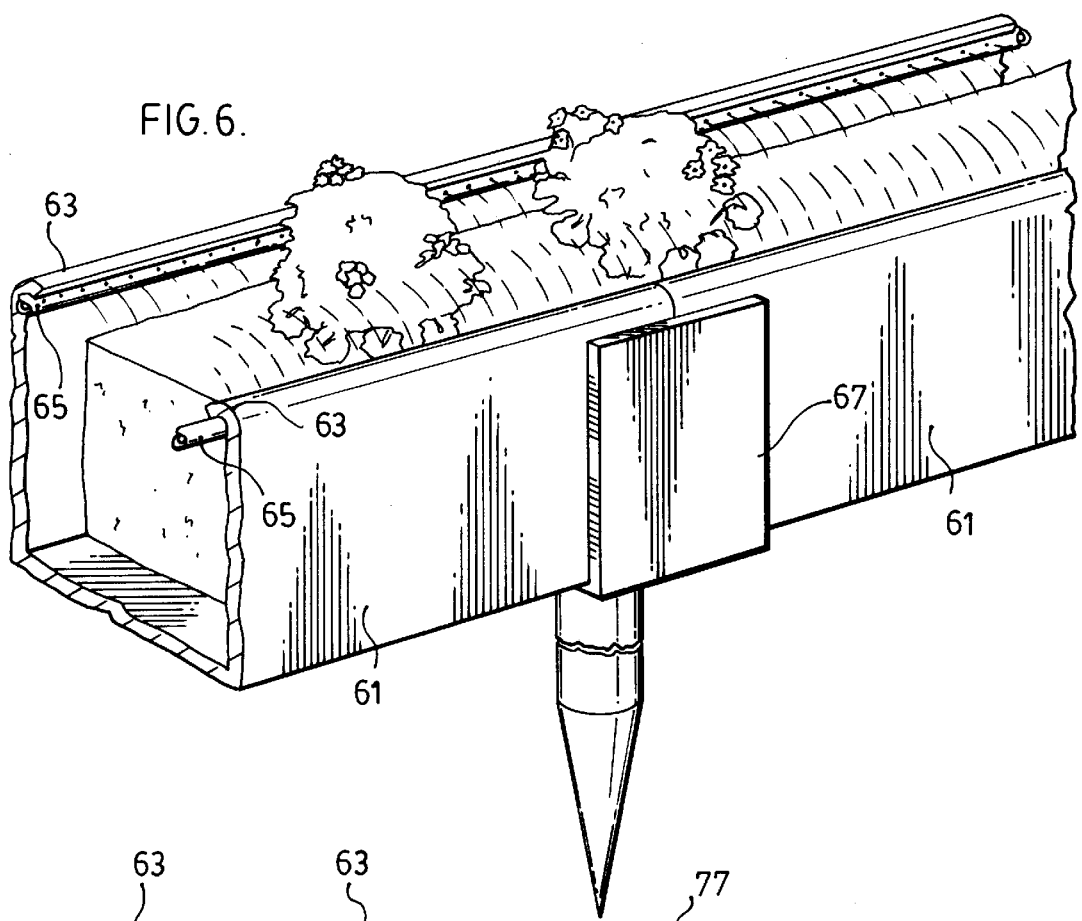
FIG. 6 is a sectioned perspective view of a planter system according to a further preferred embodiment of the present invention.
Figure 7:
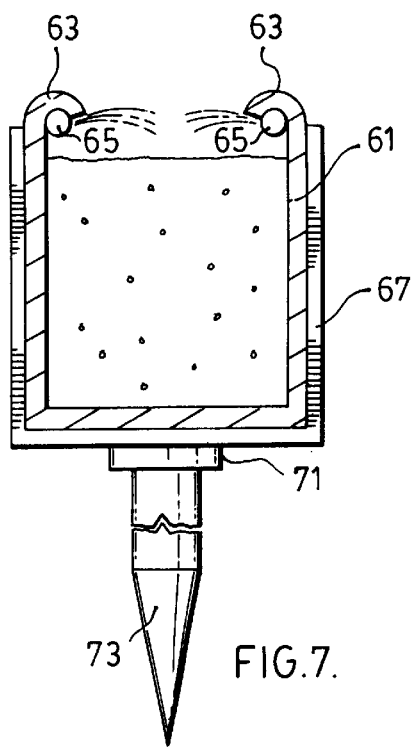
FIG. 7 is an end view of the planter system of FIG. 6.

FIGS. 6 and 7 show a further preferred feature of the present invention in which a plurality of planter boxes 61 are placed end to end with one another. The meeting ends of adjacent planter boxes 61 are held together at a support bracket 67.

The upper edges of the side walls of each planter box 61 are inwardly turned or rolled as indicated at 63 to receive a pair of hose-like conduits 65. These conduits which continue along the length of aligned planter boxes are provided with perforations to provide a spray from a pressure source fed through the conduits. One of the conduits may be hooked up with a supply of water while the other conduit may be hooked up to a fertilizer supply to provide watered fertilizing of the plants within the line of planter boxes.

Figure 8:
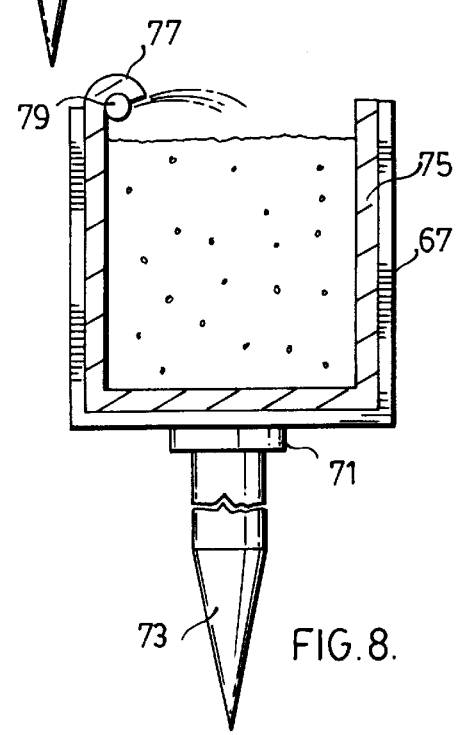
FIG. 8 is a sectional view through a planter system according to still a further preferred embodiment of the present invention.

A slightly modified arrangement is shown in FIG. 8 whereby only one edge 77 of a planter box 75 is rolled to receive a single perforated conduit 79. In this case, the conduit may be fed by a combination of water and fertilizer which is sprayed onto the plants from one side of the planter box only.

As shown in FIGS. 7 and 8, bracket 67 has a downward opening sleeve 71 which fits over a ground spike 73. This ground spike does not include any platform portion but rather terminates with an integral bottom end tapered tip. With this setup all height adjustments will be made at the top end of the post which is releasably and slideably secured within the bracket sleeve 71.

FIG. 9 shows a further preferred feature of the present invention in which a plurality of planter boxes are placed end to end with one another. Planter boxes 81 are placed end to end. Adjacent ends of planter boxes 81 sit inside support brackets 83. Posts 84 elevate brackets 83 from the ground. Sleeves 85 engage posts 84 to provide a base for the elevated planter box. As described earlier, plates 82 provide internal dividers for planter boxes 81.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A planter assembly comprising a planter box and a support structure for said planter box, said support structure comprising an elevated post, a base beneath said post and a planter box support atop said post, one of said base and said support being releasable from and enabling height adjustment trimming of said post and said one of said base and said support being refittable with said post after any such trimming thereof, said post comprising a hollow profile of uniform inside and outside diameter over the full length of said post.

2. A planter assembly as claimed in claim 1, wherein said planter box has a bottom wall with at least one water drainage opening therethrough and wherein said water drainage opening is located directly above said support, said support having a water drain therethrough into said post and said support structure having a lower end water drain for draining water from said planter assembly.

3. A planter assembly comprising a planter box and a support structure for said planter box, said support structure comprising an elevating post, a base beneath said post and a planter box support atop said post, said base being releasable from and enabling height adjustment trimming of said post and said base being refittable with said post after any such trimming thereof, said base and said post being releasably securable by a sleeve fit interlock.

4. A planter assembly comprising a planter box and a support structure for said planter box, said support structure comprising an elevated post, a base beneath said post and a planter box support atop said post, one of said base and said support being releasable from and enabling height adjustment trimming of said post and said one of said base and said support being refittable with said post after any such trimming thereof, said planter box being open at opposite ends thereof for fitting with other planter boxes supported by other support structures to form an extended planter system, said planter box having an elongated U-shape and wherein said support has a shorter U-shape dimensioned such that said planter box fits snugly into said planter box support.

5. A planter assembly comprising a planter box and a support structure for said planter box, said support structure comprising an elevated post, a base beneath said post and a planter box support atop said post, one of said base and said support being releasable from and enabling height adjustment trimming of said post and said one of said base and said support being refittable with said post after any such trimming thereof, said base further comprising a spike to be embedded in an earthen support for said planter assembly.

6. A planter assembly comprising a planter box and a support structure for said planter box, said support structure comprising an elevated post, a base beneath said post and a planter box support atop said post, one of said base and said support being releasable from and enabling height adjustment trimming of said post and said one of said base and said support being refittable with said post after any such trimming thereof, said base being flat and heavy enabling seating on a platform surface for said planter assembly.

* * * * *